Dec. 22, 1936.  J. G. RAYNIAK  2,065,154

PROPELLER

Filed March 30, 1934

Inventor:
Joseph G. Rayniak
By Kent W. Worrell
Atty.

Patented Dec. 22, 1936

2,065,154

UNITED STATES PATENT OFFICE 2,065,154

PROPELLER

Joseph G. Rayniak, Waukegan, Ill., assignor to Johnson Motor Company, Waukegan, Ill., a corporation of Delaware Application March 30, 1934, Serial No. 718,239

5 Claims. (Cl. 170—173)

This invention relates in general to a propeller for boats and has more particular reference to a propeller constructed entirely from sheet metal.

An important object of the invention is in the provision of a propeller which is stamped or otherwise made from sheet metal.

A further object of the invention is in the provision of a simple, light and strong propeller with a bearing member secured therein for mounting it upon a propeller shaft.

Other objects of the invention will appear hereinafter, a preferred embodiment of the invention being illustrated in the accompanying drawing.

Figure 1:
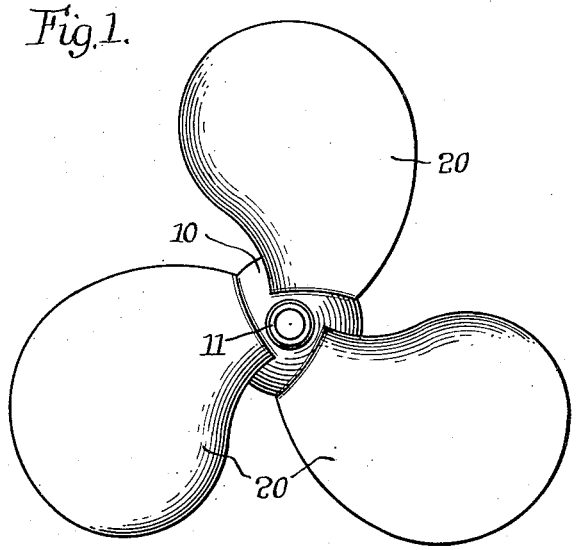
Fig. 1 is an end view of a propeller constructed in accordance with the principles of this invention.
Figure 2:
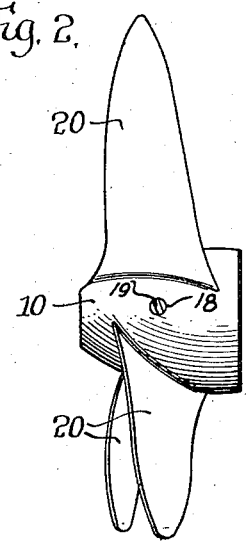
Fig. 2 is a side view of the propeller.

Propellers for boats are now commonly made by casting or molding and the present invention relates to the provision of a sheet metal propeller in which both the hub and the blades of the propeller are made of sheet metal, the parts being reinforced and connected together to provide a strong simple structure which is light and efficient and is also inexpensive.

Referring now more particularly to the drawing, a hub casing 10 is formed of sheet metal having a somewhat rounded conical shape. This casing may be cut from a blank of sheet metal and rounded and the ends secured together by brazing, welding or the like, or the casing may be a spinning, or pressed by dies from a suitable blank of sheet metal.

Inserted within the casing 10 is a bearing hub 11 having a reduced outer extremity 12 which is secured to the adjacent end of the casing by a fillet of welding or soldering metal 13 which is filled in to form a smooth joint at the end of the hub. The inner end of the bearing member 11 has a shouldered enlargement 14 forming a seat for short arms 15 inserted between it and the adjacent inner surface of the casing 10 and secured thereto by fillets 16 of welding or soldering metal for strengthening the attachment of the parts and for forming a smooth joint between them. At the inner end of the bearing member 11 is a transverse notch or recess 17 adapted to seat a shear pin which is inserted through an opening 18 in the wall of the casing 10 and through a shaft (not shown) for supporting the propeller. The opening in the casing may be closed by a small screw 19 which also holds the shear pin in place.

Figure 3:
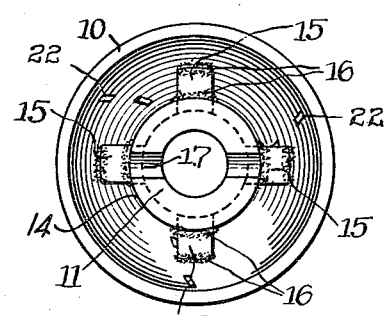
Fig. 3 is an end view of the propeller hub.
Figure 4:
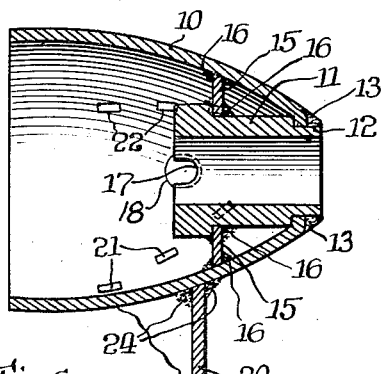
Fig. 4 is a section of the propeller hub.
Figure 5:
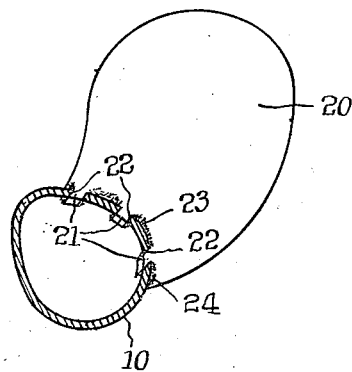
Fig. 5 is a perspective showing a blade inserted in the propeller hub.
Figure 6:
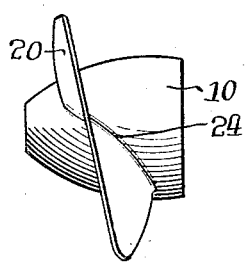
Fig. 6 is an elevation of a single blade inserted in the propeller hub.

Each of the blades 20 is formed or pressed out of sheet metal having the proper curvature to form an efficient propeller blade and the inner edge conforms to the curvature of the outer surface of the hub casing 10 so that it will lie smoothly and flatly against the casing with a number of tongues or projections 21 extending therefrom and adapted to be inserted through corresponding openings 22 in the wall of the casing. These projections when inserted within the casing may be bent over to seal the blades in place and also welded or soldered therein to hold the blades tightly therein. The soldering or welding is represented in Figs. 3 and 4 by fillets 23 of material and the outside edges of the blades where they join the outer surface of the casing may be also connected by metal fillets 24 as shown more clearly in Fig. 4.

With this construction propellers of various sizes can be made entirely of sheet metal and the parts when connected and assembled are extremely rigid and strong. They are also light in weight and may be made of stainless steel or other non-corrosive metal. No extensive foundry or machine shop is required to produce propellers of this kind and they are therefore relatively inexpensive and alterations in pitch or size may be conveniently made.

I claim:

1. A sheet metal propeller comprising the combination with a conoidal sheet metal shell open at its larger end and provided at its smaller end with a hub sleeve projecting centrally into said shell and provided with a shouldered terminal portion, said shell having apertures in its peripheral wall portions exposed beyond the end of said sleeve, bracing means connecting the shouldered terminal portions of the sleeve with the shell between the apertured wall portions of the shell and the smaller end thereof, and blades applied to the external periphery of said shell and having tongues extending through said apertures and connected therewithin with said shell.

2. A sheet metal propeller comprising the combination with a conoidal sheet metal shell open at its larger end, of a peripherally shouldered sleeve fitted to the smaller end of the shell, a weld connecting said sleeve with said shell, means bracing the inner end of the sleeve from an intermediate interior portion of the shell, and a plurality of said metal blades with free outer end portions having their inner ends in welded connection with the shell.

3. A sheet metal propeller comprising the combination with a conoidal sheet metal shell open at its larger end, of a peripherally shouldered sleeve fitted to the smaller end of the shell, a weld connecting said sleeve with said shell, means bracing the inner end of the sleeve from an intermediate interior portion of the shell, and a plurality of said metal blades with free outer end portions having their inner ends in welded connection with the shell, said shell having spaced apertures in registry with the base of each of said blades and said blades having a plurality of tongues extended through the registered apertures and welded to the interior of said shell.

4. A sheet metal propeller comprising the combination with a rearwardly tapering conoidal sheet metal shell having its larger end open to expose its interior, of a sleeve fitted in the smaller end of the shell, an intermediate brace connecting the forward end of the sleeve with an intermediate portion of the shell and blades disposed about the exterior periphery of the shell and having tongues extending through the shell and provided with an interior weld connecting them with the shell at points interiorly exposed beyond said sleeve and supporting means.

5. A propeller comprising the combination with a supporting sleeve, of a shell of tapered form having its smaller end corresponding in diameter to said sleeve and directly connected therewith, said shell being of a length greatly in excess of said sleeve and having its larger end remote from said sleeve open to expose the interior of the shell, means bracing the inner end of the sleeve from an intermediate portion of said shell, said shell being peripherally apertured beyond said sleeve, blades mounted on exterior periphery of said shell and having tongues extending through the respective apertures, and means exposed in the interior of said shell connecting said tongues with said shell.

JOSEPH G. RAYNIAK.